United States Patent
Inoue et al.

(10) Patent No.: US 11,437,703 B2
(45) Date of Patent: Sep. 6, 2022

(54) WINDOW GLASS FOR VEHICLE

(71) Applicant: AGC INC., Tokyo (JP)

(72) Inventors: Takafumi Inoue, Tokyo (JP); Naoki Hashimoto, Tokyo (JP); Tsuyoshi Yamamoto, Tokyo (JP); Shintaro Kojima, Tokyo (JP); Seiji Morimoto, Tokyo (JP); Masakazu Okabe, Tokyo (JP)

(73) Assignee: AGC INC., Tokyo (JP)

(*) Notice: Subject to any disclaimer, the term of this patent is extended or adjusted under 35 U.S.C. 154(b) by 375 days.

(21) Appl. No.: 16/743,639

(22) Filed: Jan. 15, 2020

(65) Prior Publication Data

US 2020/0153078 A1 May 14, 2020

Related U.S. Application Data

(63) Continuation of application No. PCT/JP2018/026044, filed on Jul. 10, 2018.

(30) Foreign Application Priority Data

Jul. 18, 2017 (JP) .............................. JP2017-139320

(51) Int. Cl.
*H01Q 1/12* (2006.01)
*B32B 17/10* (2006.01)
*H05B 3/84* (2006.01)

(52) U.S. Cl.
CPC ..... *H01Q 1/1278* (2013.01); *B32B 17/10385* (2013.01); *H05B 3/84* (2013.01); *H05B 2203/002* (2013.01); *H05B 2203/011* (2013.01)

(58) Field of Classification Search
CPC .................. H01Q 1/1278; H01Q 21/28; B32B 17/10385; H05B 3/84; H05B 2203/002;
(Continued)

(56) References Cited

U.S. PATENT DOCUMENTS

| 2007/0108175 | A1 | 5/2007 | Andrt | |
|---|---|---|---|---|
| 2009/0015492 | A1* | 1/2009 | Kuehne | H01Q 1/1278 343/704 |
| 2009/0096690 | A1* | 4/2009 | Shimo | H01Q 1/1278 343/713 |

(Continued)

FOREIGN PATENT DOCUMENTS

| EP | 1 898 675 A2 | 3/2008 |
|---|---|---|
| JP | H03-51634 A | 5/1991 |

(Continued)

OTHER PUBLICATIONS

International Searching Authority, "International Search Report," issued in connection with International Patent Application No. PCT/JP2018/026044, dated Sep. 18, 2018.

(Continued)

*Primary Examiner* — Shawntina T Fuqua
(74) *Attorney, Agent, or Firm* — Foley & Lardner LLP

(57) ABSTRACT

A window glass for a vehicle includes a glass plate for window of the vehicle, a defogger on the glass plate, and an antenna on the glass plate. The defogger includes a pair of bus bars extending in a height direction of the glass plate, a first defogging area formed by a plurality of first heating wires connected between the pair of bus bars and extending in a widthwise direction of the glass plate, and a second defogging area formed by at least a second heating wire connected to the pair of bus bars or to the first defogging area and extending in a protruding manner to one side in the height direction to surround a wiring-prohibited area. The antenna is provided in at least one of areas that are an area on left of the second defogging area and an area on right of the second defogging area.

15 Claims, 8 Drawing Sheets

(58) Field of Classification Search
CPC ........ H05B 2203/011; H05B 2203/005; H05B 2203/014; B60S 1/02; B60S 1/58; B60J 1/00; B60J 1/18; B60Q 1/44; B60R 1/00; H04N 7/18; H04N 5/247
See application file for complete search history.

(56) References Cited

U.S. PATENT DOCUMENTS

| | | | |
|---|---|---|---|
| 2012/0152930 A1* | 6/2012 | Chamberlain | H05B 3/86 219/203 |
| 2018/0277924 A1* | 9/2018 | Shigeta | H01Q 1/1278 |

FOREIGN PATENT DOCUMENTS

| | | | |
|---|---|---|---|
| JP | 2003-249806 A | 9/2003 |
| JP | 2004-040144 A | 2/2004 |
| JP | 2007-510610 A | 4/2007 |
| JP | 2007-295536 A | 11/2007 |
| JP | 2008-067300 A | 3/2008 |
| JP | 2010-154498 A | 7/2010 |
| JP | 2011-101190 A | 5/2011 |
| JP | 2017-073751 A | 4/2017 |
| JP | 2018-135020 A | 8/2018 |

OTHER PUBLICATIONS

International Searching Authority, "Written Opinion," issued in connection with International Patent Application No. PCT/JP2018/026044, dated Sep. 18, 2018.

* cited by examiner

WINDOW GLASS FOR VEHICLE

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2018/026044 filed on Jul. 10, 2018 and designating the U.S., which claims priority of Japanese Patent Application No. 2017-139320 filed on Jul. 18, 2017. The entire contents of the foregoing applications are incorporated herein by reference.

BACKGROUND OF THE INVENTION

1. Field of the Invention

The present invention relates to window glass for a vehicle.

2. Description of the Related Art

Conventionally, a technique for installing an in-vehicle camera so that an antenna and a heating wire of a defogger formed on a rear glass of a vehicle do not come into an image-capturing area is known (see, for example, Japanese Laid-Open Patent Publication No. 2017-073751).

SUMMARY OF THE INVENTION

However, when a heating wire is attempted to be arranged in order to defog a wiring-prohibited area such as the image-capturing area described above, it may be impossible to arrange the heating wire because of the presence of the antenna. Conversely, it may be impossible to arrange the antenna because of the presence of the heating wire.

Therefore, in the present disclosure, a window glass for a vehicle that achieves both of defogging in a wiring-prohibited area and securing of an area for arranging an antenna is provided.

According to an aspect of the present disclosure, provided is a window glass for a vehicle including:
a glass plate for a window of the vehicle;
a defogger provided on the glass plate; and
an antenna provided on the glass plate,
wherein the defogger includes:
a pair of bus bars extending in a height direction of the glass plate;
a first defogging area formed by a plurality of first heating wires connected between the pair of bus bars and extending in a widthwise direction of the glass plate; and
a second defogging area formed by at least a second heating wire connected to the pair of bus bars or to the first defogging area and extending in a protruding manner to one side in the height direction to surround a wiring-prohibited area,
wherein the antenna is provided in at least one of areas that are an area on left of the second defogging area and an area on right of the second defogging area.

According to an aspect of the present disclosure, a window glass for a vehicle that achieves both of defogging in a wiring-prohibited area and securing of an area for arranging an antenna can be provided.

DETAILED DESCRIPTION OF THE PREFERRED EMBODIMENTS

Hereinafter, an embodiment for carrying out the present invention will be described with reference to the drawings. In each embodiment, deviations from directions such as a parallel direction, a perpendicular direction, a widthwise direction, and a height direction are tolerated to such an extent so as not to impair the effects of the present invention. Further, the shape at a corner portion of an antenna element is not limited to a right angle, and may be rounded in a shape of a bow. Each top view is a view when a glass face of a glass plate (hereinafter also referred to as "window glass") for a vehicle window is seen by facing the glass face, and illustrates the window glass attached to the vehicle as seen from a vehicle-inner side (a viewpoint from the inside of the vehicle). In a case where the window glass is a windshield attached to a front portion of the vehicle or rear glass attached to a rear portion of the vehicle, a height direction in each top view corresponds to a height direction of the vehicle, and a widthwise direction in each top view corresponds to a widthwise direction of the vehicle. Further, the window glass is not limited to a windshield or a rear glass, and may be, for example, a side glass attached to a side portion of the vehicle. In each top view, the direction parallel to an X axis (X axis direction), the direction parallel to a Y axis (Y axis direction), and the direction parallel to a Z axis (Z axis direction) represent a widthwise direction of the glass plate, a height direction of the glass plate, and a direction perpendicular to the face of the glass plate (also referred to as a normal direction), respectively. The X axis direction, the Y axis direction, and the Z axis direction are orthogonal to each other.

Figure 1:
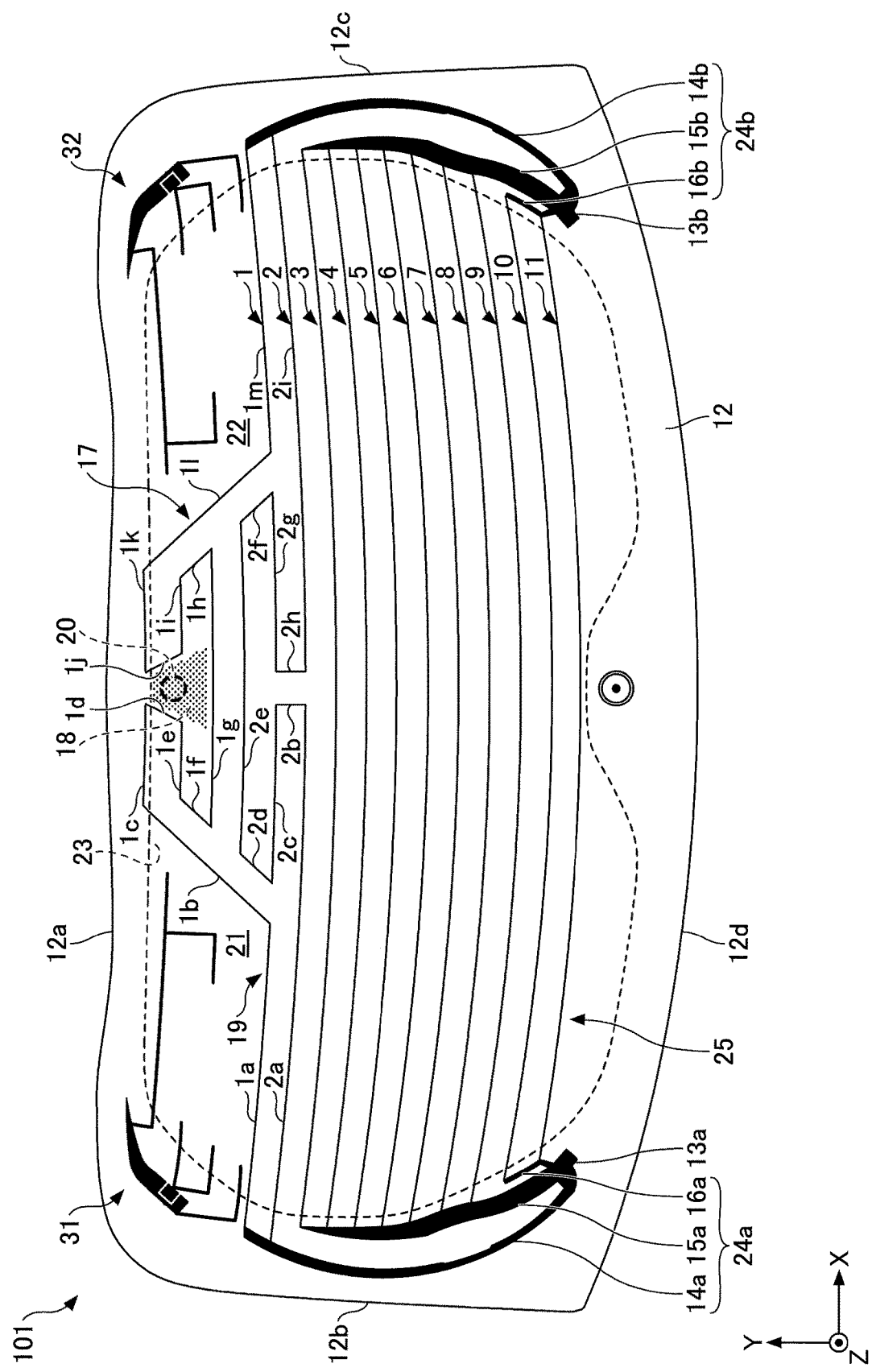
FIG. 1 is a top view illustrating a first configuration example of a window glass for a vehicle as seen from a vehicle-inner side.

FIG. 1 is a top view illustrating a first configuration example of a window glass for a vehicle as seen from a vehicle-inner side. A window glass 101 for a vehicle illustrated in FIG. 1 is an example of a rear glass attached to the rear portion of a vehicle. The window glass 101 for a vehicle includes a glass plate 12 for a vehicle window, a defogger 19 disposed in the glass plate 12, a left rear antenna 31 disposed in a left-hand side area of the glass plate 12, and a right rear antenna 32 disposed in a right-hand side area of the glass plate 12.

The glass plate 12 is an example of a glass plate for a vehicle window. An outer shape of the glass plate 12 is substantially in a quadrilateral shape. An upper edge 12a represents a glass edge at an upper side of the glass plate 12. A lower edge 12d represents a glass edge at a lower side of the glass plate 12 (i.e., a side opposite to the upper edge 12a). A left edge 12b represents a glass edge at a left-hand side of the glass plate 12. A right edge 12c represents a glass edge at a right-hand side of the glass plate 12 (i.e., a side opposite to the left edge 12b). The left edge 12b is a glass edge adjacent to the left-hand side portions of the upper edge 12a and the lower edge 12d. The right edge 12c is a glass edge adjacent to right-hand side portions of the upper edge 12a and the lower edge 12d.

The glass plate 12 has a pair of side edges. The left edge 12b is an example of a first side edge which is one of the pair of side edges. The right edge 12c is an example of a second side edge which is the other of the pair of side edges. Although a connection portion between the upper edge 12a and the left edge 12b is connected with a curvature, the connection portion may be connected without a curvature. This is also applicable to the shapes of the connection portions between other edges.

The defogger 19 is an electrical heating type conductor pattern that defogs the glass plate 12. The defogger 19 includes a plurality of heating wires extending in the widthwise direction of the glass plate 12 and a plurality of bus bars that feed power to the plurality of heating wires. In the present embodiment, eleven heating wires 1 to 11 extending in the widthwise direction of the glass plate 12 so as to run in parallel to each other, and a pair of bus bars 24a, 24b connected to the eleven heating wires 1 to 11 are provided on the glass plate 12. When a voltage is applied between the pair of bus bars 24a, 24b, the eleven heating wires 1 to 11 are energized to generate heat, which defogs the glass plate 12.

The eleven heating wires 1 to 11 are conductive patterns connected between the left bus bar 24a and the right bus bar 24b. The left bus bar 24a is an example of a first bus bar, and is a conductive pattern extending in the height direction of the glass plate 12 along the left edge 12b. The right bus bar 24b is an example of a second bus bar, and is a conductive pattern extending in the height direction of the glass plate 12 along the right edge 12c.

In the present embodiment, the pair of bus bars 24a, 24b is formed to include three pairs of partial bus bars. The heating wires 1, 2 are connected to a first pair of partial bus bars 14a, 14b. The heating wires 3 to 9 are connected to a second pair of partial bus bars 15a, 15b. The heating wires 10, 11 are connected to a third pair of partial bus bars 16a, 16b.

The heating wires 1, 2 are conductive patterns connected between the first left partial bus bar 14a and the first right partial bus bar 14b. The heating wires 3 to 9 are conductive patterns connected between the second left partial bus bar 15a and the second right partial bus bar 15b. The heating wires 10, 11 are conductive patterns connected between the third left partial bus bar 16a and the third right partial bus bar 16b.

The lower end portions of the first left partial bus bar 14a, the second left partial bus bar 15a, and the third left partial bus bar 16a are connected to each other. The lower end portion is a left bus bar feeding portion 13a connected to one electrode (for example, the positive electrode) of a power source (not illustrated). The lower end portions of the first right partial bus bar 14b, the second right partial bus bar 15b, and the third right partial bus bar 16b are connected to each other. The lower end portion is a right bus bar feeding portion 13b connected to the other electrode (for example, the negative electrode) of the power source (not illustrated).

The defogger 19 includes: a first defogging area 25; and a second defogging area 17 formed so as to protrude from the central portion of the glass plate 12 toward the upper edge 12a of the glass plate 12.

In the present embodiment, the first defogging area 25 is formed by nine heating wires 3 to 11. The upper edge of the first defogging area 25 is the highest heating wire 3 among the plurality of heating wires 3 to 11. The lower edge of the first defogging area 25 is the lowest heating wire 11 among the plurality of heating wires 3 to 11. Each of the heating wires 3 to 11 is an example of a first heating wire.

In the present embodiment, the second defogging area 17 is formed by two heating wires 1, 2. The upper edge of the second defogging area 17 is the highest heating wire 1 among the plurality of heating wires 1, 2. The lower edge of the second defogging area 17 is the lowest heating wire 2 of the plurality of heating wires 1, 2. Each of the heating wires 1, 2 is an example of a second heating wire. The heating wires 1, 2 are connected to a pair of bus bars 24a, 24b, and extend in one of an upward side and a downward side in the height direction of the glass plate 12. More specifically, the heating wires 1, 2 are connected to a pair of partial bus bars 14a, 14b and extend from the central portion of the glass plate 12 in the direction of the upper edge 12a.

The left rear antenna 31 is provided in a left upper area 21 that is formed above the first defogging area 25 and at the left-hand side of the second defogging area 17. The right rear antenna 32 is provided in a right upper area 22 above the first defogging area 25 and at the right-hand side of the second defogging area 17.

A diversity antenna can be constituted by the left rear antenna 31 and the right rear antenna 32. Also, when a desired antenna gain can be obtained, only one of the left rear antenna 31 and the right rear antenna 32 may be provided on the glass plate 12.

The left rear antenna 31 is an example of a first antenna and is arranged in the left upper area 21 of the glass plate 12. The left rear antenna 31 is an example of a glass antenna having a pair of feeding portions and a plurality of antenna conductors, and is a conductive pattern provided on the glass plate 12 in a planar manner.

The shape of the left rear antenna 31 is suitable for transmitting and receiving radio waves in the VHF (Very High Frequency) band having a frequency of 30 MHz to 300 MHz and the UHF (Ultra High Frequency) band having a frequency of 300 MHz to 3 GHz. Radio waves in the UHF band include terrestrial digital television broadcast waves from 470 MHz to 720 MHz. The left rear antenna 31 resonates within the VHF or UHF frequency bands.

The right rear antenna 32 is an example of a second antenna and is arranged in the right upper area 22 of the glass plate 12. The right rear antenna 32 is an example of a glass antenna having a pair of feeding portions and a plurality of antenna conductors, and is a conductive pattern provided on the glass plate 12 in a planar manner.

The shape of the right rear antenna 32 is suitable for transmitting and receiving radio waves in the VHF (Very High Frequency) band with a frequency of 30 MHz to 300 MHz and the UHF (Ultra High Frequency) band with a frequency of 300 MHz to 3 GHz. Radio waves in the UHF band include terrestrial digital television broadcast waves from 470 MHz to 720 MHz. The right rear antenna 32 resonates within the VHF or UHF frequency bands.

As illustrated in the figure, the left rear antenna 31 and the right rear antenna 32 have the same shape as each other (or substantially the same shape), and may be formed symmetrically (or substantially symmetrically) with respect to the axis of symmetry extending in the height direction of the glass plate 12. Note that the shapes of the left rear antenna 31 and the right rear antenna 32 are not limited to the illustrated shapes.

The second defogging area 17 is formed by the heating wires 1, 2 so as to surround the image-capturing area 18 for a camera 20 mounted on the vehicle.

The camera 20 is mounted at the vehicle-inner side relative to the glass plate 12, and is an apparatus that captures images outside the vehicle (in the present embodiment, behind the vehicle) through the glass plate 12. For example, an image captured by the camera 20 is displayed on a display in the vehicle, thereby assisting the driver of the vehicle to visually recognize the situation around the vehicle.

The image-capturing area 18 is an area on the glass plate 12 and represents an area through which the images are captured by the camera 20. Objects existing in the image-capturing area 18 can be displayed on the display. The image-capturing area 18 is an example of a wiring-prohibited area. Specifically, the heating wires and the wiring of the antennas are prohibited in the image-capturing area 18.

Since the heating wires 1, 2 are arranged so as to surround the image-capturing area 18, the heating wires 1, 2 can be prevented from appearing in the image captured by the camera 20. In addition, by applying a voltage between the pair of bus bars 24a, 24b, the heating wires 1, 2 are energized to generate heat, which can defog the image-capturing area 18. Further, the heating wires 1, 2 extend in the direction of the upper edge 12a so as to form the left upper area 21 and the right upper area 22. Therefore, the areas for arranging the left rear antenna 31 and the right rear antenna 32 can be easily secured. Therefore, the window glass 101 for a vehicle according to the present embodiment can achieve both the defogging of the image-capturing area 18 and the securing of the areas for arranging the left rear antenna 31 and the right rear antenna 32.

The heating wire 1 is a single line formed continuously by line portions 1a to 1m. The heating wire 1 has a left end portion connected to the first left partial bus bar 14a of the left bus bar 24a and a right end portion connected to the first right partial bus bar 14b of the right bus bar 24b.

The line portion 1a extends from the first left partial bus bar 14a of the left bus bar 24a in the right direction to the right end portion. The line portion 1b extends from the right end portion of the line portion 1a in the right upper direction to the right upper end portion. The line portion 1c extends from the right upper end portion of the line portion 1b in the right direction to the right end portion. The line portion 1d extends from the right end portion of the line portion 1c in the left lower direction to the left lower end portion. The line portion 1e extends from the left lower end portion of the line portion 1d in the left direction to the left end portion. The line portion 1f extends from the left end portion of the line portion 1e in the left lower direction to the left lower end portion. The line portion 1g extends from the left lower end portion of the line portion 1f in the right direction to the right end portion. The line portion 1h extends from the right end portion of the line portion 1g in the left upper direction to the left upper end portion. The line portion 1i extends from the left upper end portion of the line portion 1h in the left direction to the left end portion. The line portion 1j extends from the left end portion of the line portion 1i in the left upper direction to the left upper end portion. The line portion 1k extends from the left upper end portion of the line portion 1j in the right direction to the right end portion. The line portion 1l extends from the right end portion of the line portion 1k in the right lower direction to the right lower end portion. The line portion 1m extends from the right lower end portion of the line portion 1l in the right direction to the first right partial bus bar 14b of the right bus bar 24b.

The heating wire 2 is a single line formed continuously by line portions 2a to 2i. The heating wire 2 has a left end portion connected to the first left partial bus bar 14a of the left bus bar 24a and a right end portion connected to the first right partial bus bar 14b of the right bus bar 24b.

The line portion 2a extends from the first left partial bus bar 14a of the left bus bar 24a in the right direction to the right end portion. The line portion 2b extends from the right end portion of the line portion 2a in the upper direction to the upper end portion. The line portion 2c extends from the upper end portion of the line portion 2b in the left direction to the left end portion. The line portion 2d extends from the left end portion of the line portion 2c in the right upper direction to the right upper end portion. The line portion 2e extends from the right upper end portion of the line portion 2d in the right direction to the right end portion. The line portion 2f extends from the right end portion of the line portion 2e in the right lower direction to the right lower end portion. The line portion 2g extends from the right lower end portion of the line portion 2f in the left direction to the left end portion. The line portion 2h extends from the left end portion of the line portion 2g in the lower direction to the lower end portion. The line portion 2i extends from the lower end portion of the line portion 2h in the right direction to the first right partial bus bar 14b of right bus bar 24b.

The heating wire 1 includes a line portion 1d wired along the left edge of the image-capturing area 18, a line portion 1g wired along the lower edge of the image-capturing area 18, and a line portion 1j wired along the right edge of the image-capturing area 18. In this way, the heating wire 1 has a portion wired along the image-capturing area 18, and therefore, the image-capturing area 18 can be quickly defogged. It is particularly preferable that the heating wire 1 has a portion that is wired in parallel to the image-capturing area 18 in order to quickly defog the image-capturing area 18.

In the present embodiment, a film edge of a concealment film 23 is disposed along the upper edge of the image-capturing area 18 so that the film edge is out of the image-capturing area 18. As a result, the concealment film 23 can be prevented from appearing in an image captured by the camera 20 as a reflection. A specific example of the concealment film 23 includes ceramics such as a black ceramic film. When the window glass is viewed from the outside of the vehicle, the portion overlapping the concealment film 23 is not visible from the outside of the vehicle, and a window glass with excellent design can be obtained.

A line length of the heating wire 1 from the left end portion of the heating wire 1 to the right end portion of the heating wire 1 is preferably the same as a line length of the heating wire 2 from the left end portion of the heating wire 2 to the right end portion of the heating wire 2. As a result, the current values of the currents flowing through the heating wire 1 and the heating wire 2 can be brought close to a same value, so that the heating temperatures of the heating wire 1 and the heating wire 2 can be brought close to a same value. Therefore, the heating wire 1 and the heating wire 2 can perform defogging at similar rates, which can make unevenness in defogging between an area around the heating wire 1 and an area around the heating wire 2 less likely to occur.

In the present embodiment, the left end portion of the heating wire 1 is a connection portion between the left bus bar 24a and the line portion 1a. The right end portion of the heating wire 1 is a connection portion between the right bus bar 24b and the line portion 1m. The left end portion of the heating wire 2 is a connection portion between the left bus bar 24a and the line portion 2a. The right end portion of the heating wire 2 is a connection portion between the right bus bar 24b and the line portion 2i.

The heating wires 1, 2 are wired so that the second defogging area 17 is in a shape of a trapezoid. The second defogging area 17 in the shape of the trapezoid has an upper side and a lower side longer than the upper side. Of the heating wires 1, 2 extending toward the upper edge 12a, the heating wire 1 which is closer to the upper edge 12a forms the upper side of the second defogging area 17 by the line portions 1c, 1k, and the heating wire 2 which is farther from the upper edge 12a forms the lower side of the second defogging area 17 by the line portions 2c, 2g. Therefore, the heating wire 1 and the heating wire 2 can be easily wired so as to have lengths almost the same as each other.

A resistance value of the heating wire 1 from the left end portion of the heating wire 1 to the right end portion of the heating wire 1 is preferably the same as a resistance value of the heating wire 2 from the left end portion of the heating wire 2 to the right end portion of the heating wire 2. Thereby, the same amount of current flows in the heating wire 1 and the heating wire 2, and accordingly, the heating wire 1 and the heating wire 2 have the same heating temperatures. Therefore, the heating wire 1 and the heating wire 2 can perform defogging at similar rates, which can make unevenness in defogging between an area around the heating wire 1 and an area around the heating wire 2 less likely to occur.

Further, it is preferable that the heating wires 1, 2 have a portion thicker than the heating wires 3 to 11 to the extent that the appearance and visibility are not worsened. For example, at least one of the heating wire 1 and the heating wire 2 has a portion thicker than at least one of the heating wires 3 to 11. By providing such a thick line width, even when the line lengths of the heating wires 1, 2 are longer than the line lengths of the heating wires 3 to 11, the resistance values of the heating wires 1, 2 and the heating wires 3 to 11 can be brought close to a same value. Therefore, the first defogging area 25 and the second defogging area 17 can be defogged at similar rates, which can make unevenness in defogging between the first defogging area 25 and the second defogging area 17 less likely to occur.

The heating wires 1, 2 and the heating wires 3 to 11 preferably have the same resistance value as each other between the pair of bus bars 24a, 24b. Therefore, the first defogging area 25 and the second defogging area 17 can be defogged at similar rates, which can make unevenness in defogging between the first defogging area 25 and the second defogging area 17 less likely to occur.

The left rear antenna 31 is located in the left upper area 21 formed between the upper edge 12a of the glass plate 12 and the line portion 1a of the heating wire 1 and between the left edge 12b of the glass plate 12 and the line portion 1b of the heating wire 1. The right rear antenna 32 is located in the right upper area 22 formed between the upper edge 12a of the glass plate 12 and the line portion 1m of the heating wire 1 and between the right edge 12c of the glass plate 12 and the line portion 1l of the heating wire 1. As a result, the areas for arranging the left rear antenna 31 and the right rear antenna 32 can be secured.

Figure 2:
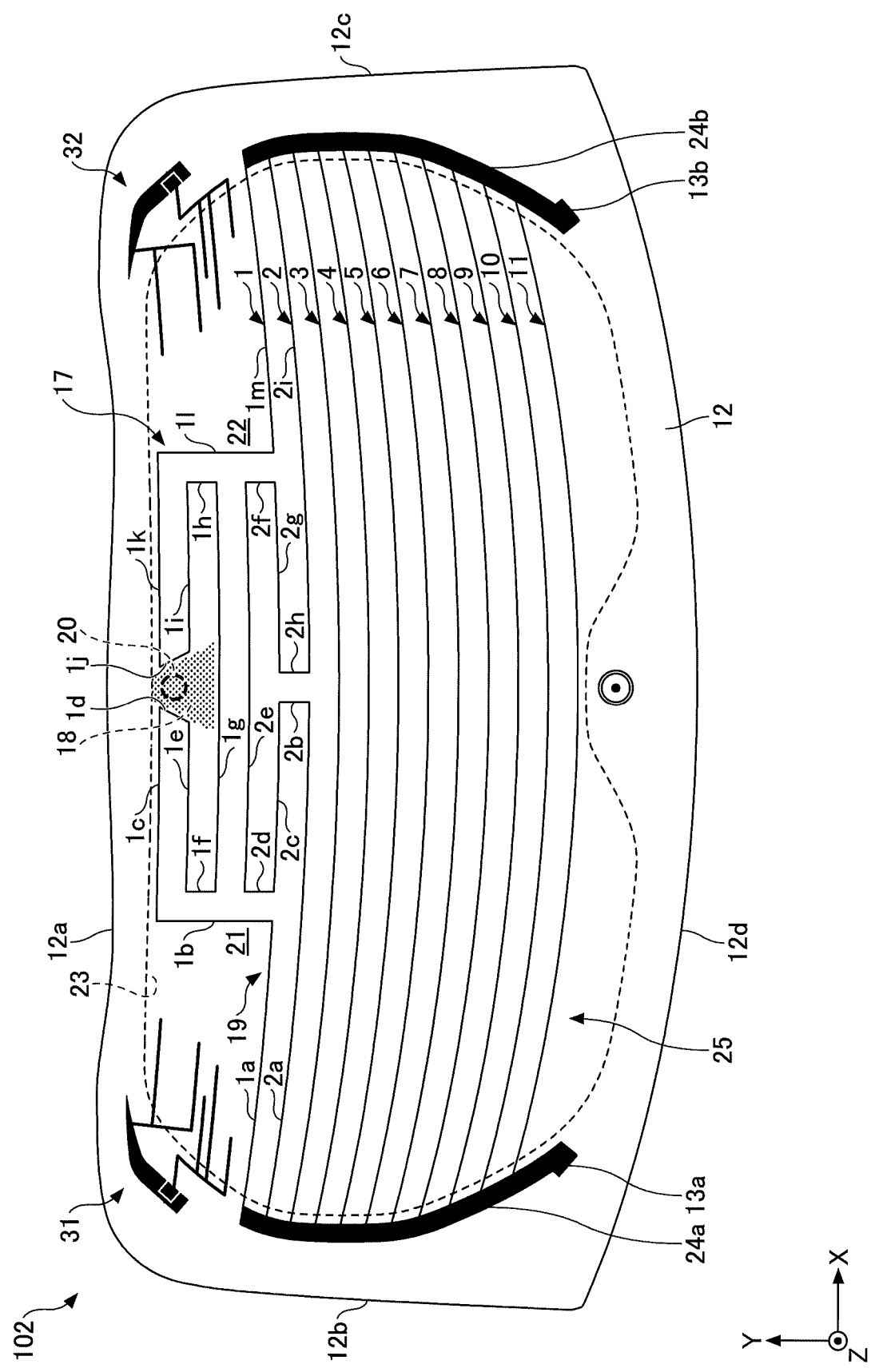
FIG. 2 is a top view illustrating a second configuration example of a window glass for a vehicle as seen from a vehicle-inner side.

FIG. 2 is a top view illustrating a second configuration example of a window glass for a vehicle as seen from a vehicle-inner side. A window glass 102 for a vehicle illustrated in FIG. 2 is different from the configuration illustrated in FIG. 2 is different from the configuration illustrated in FIG. 1 in that the directions in which the line portions 1b, 1f, 1h, 1l, 2d, and 2f extend are the height direction. Further, the shapes of the left rear antenna 31 and the right rear antenna 32, although different from the shapes in FIG. 1, are suitable for transmission and reception of radio waves in the VHF band and the UHF band. Further, the shapes of the pair of bus bars 24a, 24b are different from the shapes in FIG. 1. Explanation about constituent elements similar to those of FIG. 1 is omitted or simplified by incorporating the above explanation by reference.

The heating wires 1, 2 are wired so that the second defogging area 17 is in a rectangular shape. The heating wires 1, 2 are arranged to surround the image-capturing area 18. The heating wires 1, 2 extend in the direction of the upper edge 12a so as to form the left upper area 21 and the right upper area 22. Therefore, according to the window glass 102 for a vehicle of the present embodiment, both of the defogging of the image-capturing area 18 and the securing of areas for arranging the left rear antenna 31 and the right rear antenna 32 can be achieved.

Figure 3:
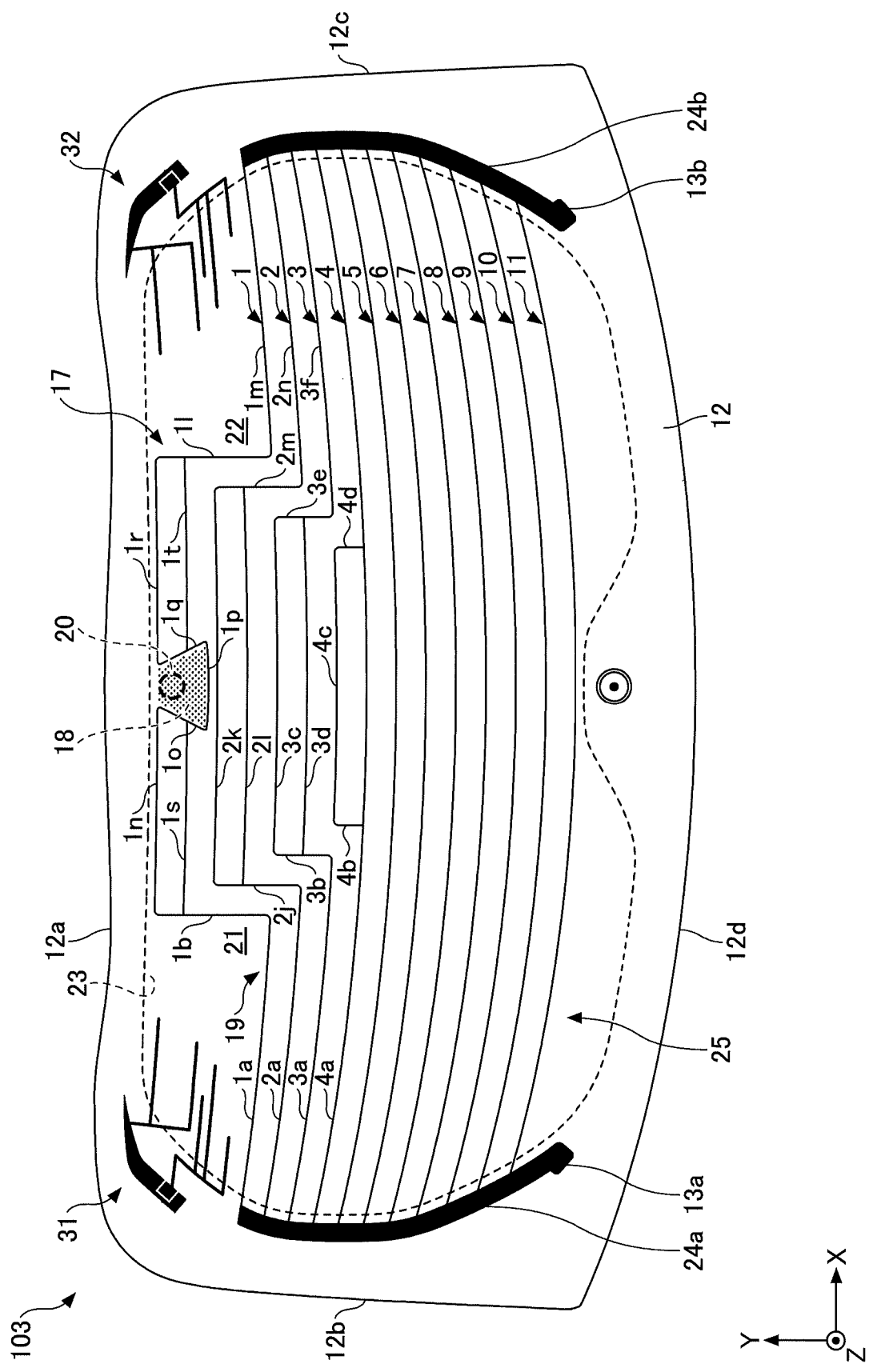
FIG. 3 is a top view illustrating a third configuration example of a window glass for a vehicle as seen from a vehicle-inner side.

FIG. 3 is a top view illustrating a third configuration example of a window glass for a vehicle as seen from a vehicle-inner side. A window glass 103 for a vehicle illustrated in FIG. 3 is different from the configuration illustrated in FIG. 2 with regard to the shapes of the heating wires 1 to 4. Explanation about constituent elements similar to those in the above figures is omitted or simplified by incorporating the above explanation by reference.

The heating wire 1 is a line formed by line portions 1a to 1t. The line portions 1n, 1s are arranged in parallel to each other and extend from the line portion 1b in the right direction to the right end portion. The right end portion of the line portions 1n, 1s is connected to the line portion 1o that extends in the left lower direction along the left edge of the image-capturing area to the left lower end portion. The line portion 1p extends from the left lower end portion of the line portion 1o in the right direction along the lower edge of the image-capturing area 18 to the right end portion. The line portion 1q extends from the right end portion of the line portion 1q in the left upper direction along the right edge of the image-capturing area 18 to the left upper end portion. The line portions 1r, 1t are arranged in parallel to each other and extend from the line portion 1q in the right direction to the right end portion. The right end portion of the line portion 1r, 1t is connected to the line portion 1l.

The heating wire 2 is a line formed by line portions 2a to 2n. The line portion 2j extends from the right end portion of the line portion 2a in the upper direction to the upper end portion. The line portions 2k, 2l are arranged in parallel to each other and extend from the line portion 2j in the right direction to the right end portion. The line portions 2k, 2l are connected to the line portion 2m extending in the height direction. The line portion 2n extends from the lower end portion of the line portion 2m in the right direction to the right bus bar 24b.

The heating wire 3 is a line formed by line portions 3a to 3f. The line portion 3a extends from the left bus bar 24a in the right direction to the line portion 3b. The line portion 3b extends in the height direction. The line portions 3c, 3d are arranged in parallel to each other and extend from the line portion 3b in the right direction to the line portion 3e. The line portion 3e extends in the height direction. The line portion 3f extends from the lower end portion of the line portion 3e in the right direction to the right bus bar 24b.

The heating wire 4 is a line formed by the line portions 4a to 4d. The line portion 4a extends from the left bus bar 24a in the right direction to the right bus bar 24b. The line portion 4b extends from the middle of the line portion 4a in the upper direction to the upper end portion. The line portion 4c extends from the upper end portion of the line portion 4b in the right direction to the right end portion. The line portion 4d extends from the right end portion of the line portion 4c in the lower direction to the line portion 4a.

The heating wires 1, 2 are wired so that the second defogging area 17 is in a rectangular shape. The heating wires 1, 2 are arranged to surround the image-capturing area 18. The heating wires 1, 2 extend in the direction of the upper edge 12a so as to form the left upper area 21 and the right upper area 22. Therefore, according to the window glass 103 for a vehicle of the present embodiment, both of the defogging of the image-capturing area 18 and the securing of areas for arranging the left rear antenna 31 and the right rear antenna 32 can be achieved.

Figure 4:
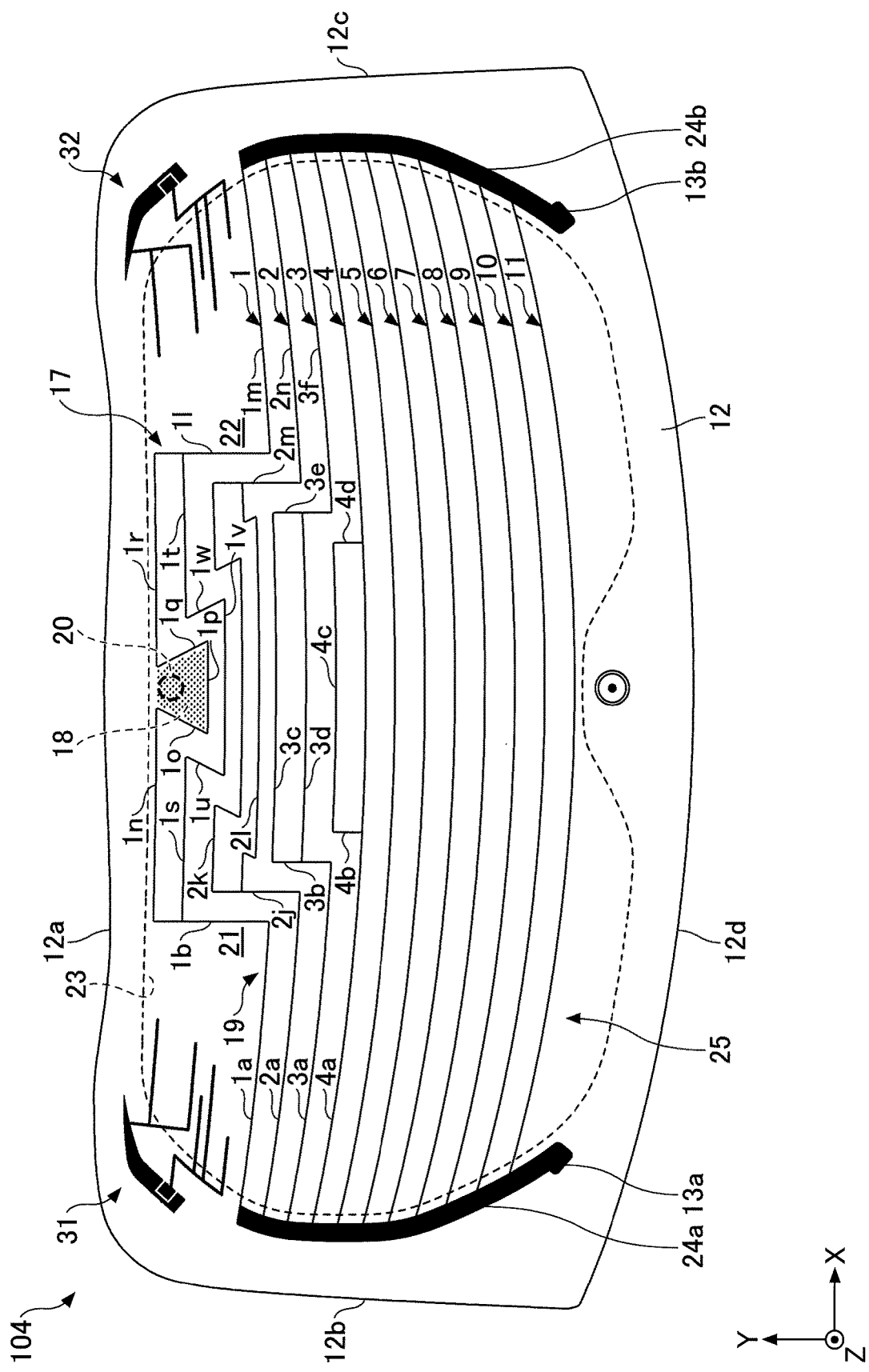
FIG. 4 is a top view illustrating a fourth configuration example of a window glass for a vehicle as seen from a vehicle-inner side.

FIG. 4 is a top view illustrating a fourth configuration example of a window glass for a vehicle as seen from a vehicle-inner side. A window glass 104 for a vehicle illustrated in FIG. 4 is different from the configuration illustrated in FIG. 3 with regard to the shapes of the heating wires 1, 2. Explanation about constituent elements similar to those of FIG. 3 is omitted or simplified by incorporating the above explanation by reference.

The heating wire 1 is a line formed by line portions 1a to 1w. The line portions 1n, is are arranged in parallel to each other and extend from the line portion 1b in the right direction to the right end portion. The right end portion of the line portion 1n is connected to the line portion 1o extending in the left lower direction along the left edge of the image-capturing area 18 to the left lower end portion. The right end portion of the line portion 1s is connected to the line portion 1u extending in the left lower direction along the left edge of the image-capturing area 18 to the left lower end portion. The line portion 1v extends from the left lower end portion of the line portion 1u in the right direction along the lower edge of the image-capturing area 18 to the right end portion. The line portion 1w extends from the right end portion of the line portion 1v in the left upper direction along the right edge of the image-capturing area 18 to the left upper end portion. The line portions 1r, 1t are arranged in parallel to each other. The line portion 1r extends from the line portion 1q in the right direction to the line portion 1l. The line portion 1t extends from the line portion 1w in the right direction to the line portion 1l. In the heating wire 2, each of the line portions 2k, 2l has a bent portion.

The heating wires 1, 2 are wired so that the second defogging area 17 is in a rectangular shape. The heating wires 1, 2 are arranged to surround the image-capturing area 18. The heating wires 1, 2 extend in the direction of the upper edge 12a so as to form the left upper area 21 and the right upper area 22. Therefore, according to the window glass 104 for a vehicle of the present embodiment, both of the defogging of the image-capturing area 18 and the securing of areas for arranging the left rear antenna 31 and the right rear antenna 32 can be achieved.

Figure 5:
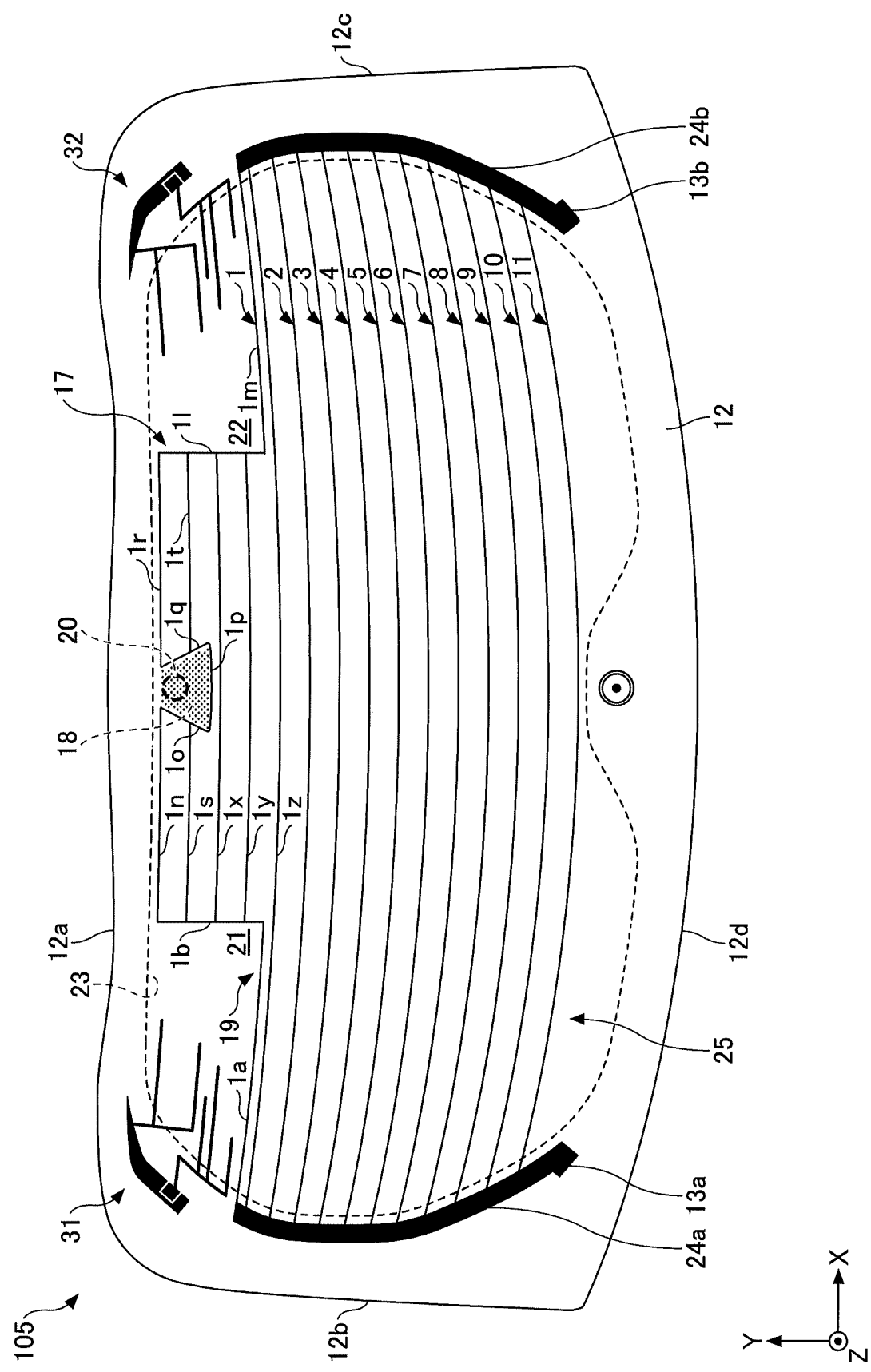
FIG. 5 is a top view illustrating a fifth configuration example of a window glass for a vehicle as seen from a vehicle-inner side.

FIG. 5 is a top view illustrating a fifth configuration example of a window glass for a vehicle as seen from a vehicle-inner side. A window glass 105 for a vehicle illustrated in the above figures is different from the configuration illustrated in FIG. 4 with regard to the shapes of the heating wire 1. Explanation about constituent elements similar to those in the above figures is omitted or simplified by incorporating the above explanation by reference.

The heating wire 1 is a line formed by line portions 1a to 1z. The line portions 1x to 1z are arranged in parallel to each other. The line portions 1x, 1y extend from the line portion 1b in the right direction to the line portion 1l. The line portion 1z extends from the left bus bar 24a in the right direction to the right bus bar 24b.

The heating wires 1, 2 are wired so that the second defogging area 17 is in a rectangular shape. The heating wire 1 is arranged so as to surround the image-capturing area 18. The heating wire 1 extends in the direction of the upper edge 12a so as to form the left upper area 21 and the right upper area 22. Therefore, according to the window glass 104 for a vehicle of the present embodiment, both of defogging of the image-capturing area 18 and securing of the arrangement areas of the left rear antenna 31 and the right rear antenna 32 can be achieved.

Figure 6:
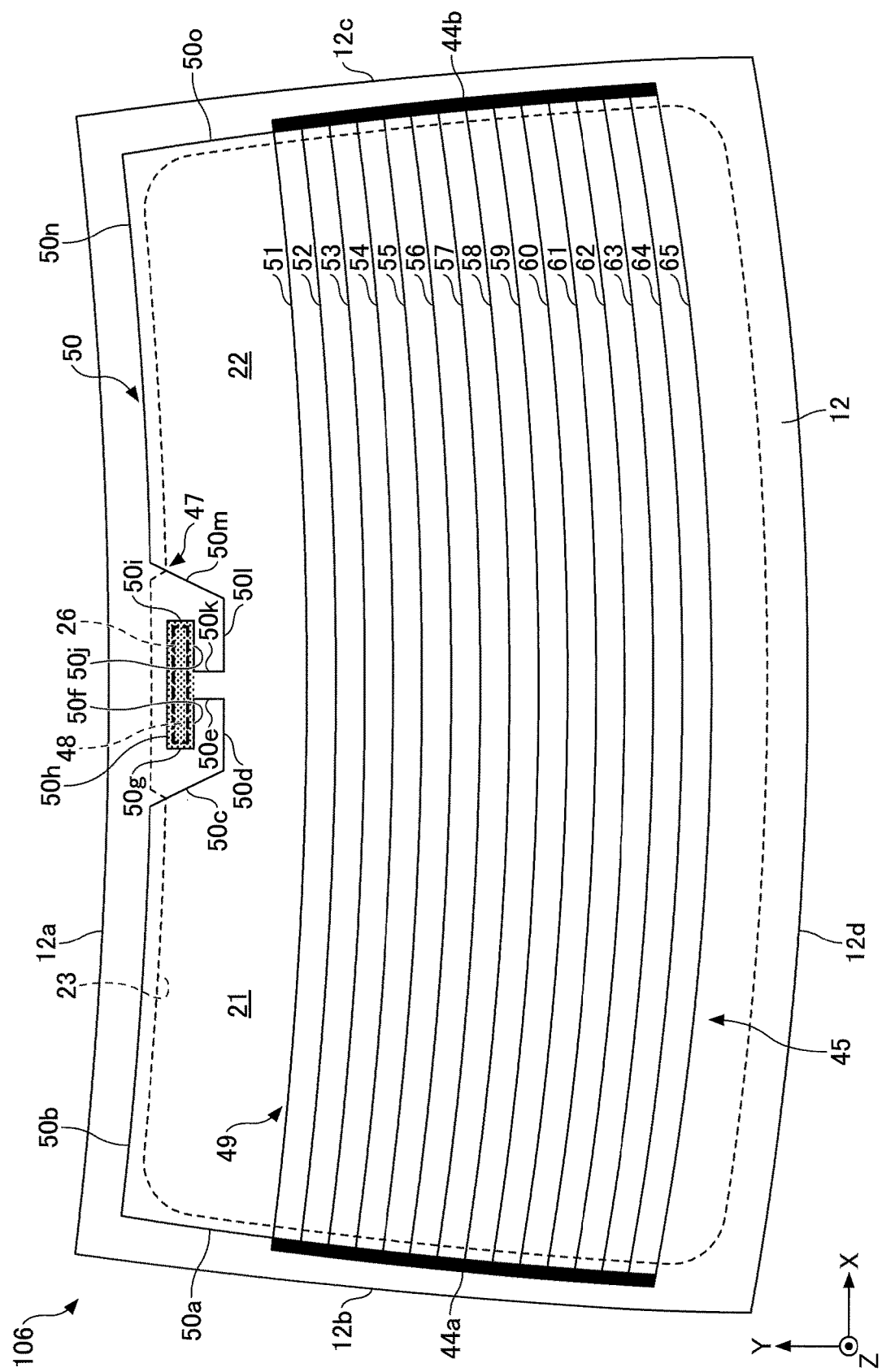
FIG. 6 is a top view illustrating a sixth configuration example of a window glass for a vehicle as seen from a vehicle-inner side.

FIG. 6 is a top view illustrating a sixth configuration example of a window glass for a vehicle as seen from a vehicle-inner side. A window glass 106 for a vehicle illustrated in FIG. 6 is different from the configuration illustrated in the above figures with regard to the shape of the second defogging area. FIG. 6 does not illustrate an antenna, but a left rear antenna 31 is provided in the left upper area 21, and a right rear antenna 32 is provided in the right upper area 22. Explanation about constituent elements similar to those in the above figures is omitted or simplified by incorporating the above explanation by reference.

The defogger 49 is an electrically heated conductive pattern for defogging the glass plate 12. The defogger 49 includes a plurality of heating wires extending in the widthwise direction of the glass plate 12 and a plurality of bus bars that feed power to the plurality of heating wires. In the present embodiment, 15 heating wires 51 to 65 extending in the widthwise direction of the glass plate 12 to run in parallel to each other and a pair of bus bars 44a, 44b connected to the 15 heating wires 51 to 65 are provided on the glass plate 12. When a voltage is applied between the pair of bus bars 44a, 44b, the fifteen heating wires 51 to 65 are energized to generate heat, and thus the glass plate 12 is defogged.

The defogger 49 has a first defogging area 45 and a second defogging area 47 formed so as to protrude from the upper edge 12a of the glass plate 12 toward the central portion of the glass plate 12.

In the present embodiment, the first defogging area 45 is formed by 15 heating wires 51 to 65. The upper edge of the first defogging area 45 is the highest heating wire 51 of the plurality of heating wires 51 to 65, and the lower edge of the first defogging area 45 is the lowest heating wire of the plurality of heating wires 51 to 65 65. Each of the heating wires 51 to 65 is an example of a first heating wire.

In the present embodiment, the second defogging area 47 is formed by a single heating wire 50. The heating wire 50 is an example of a second heating wire. The heating wire 50 is connected to the pair of bus bars 44a, 44b and extends in one of an upward side and a downward side of the height direction of the glass plate 12, and more specifically, the heating wire 50 extends from the upper end portion of each of the pair of bus bars 44a, 44b toward the upper edge 12a.

The second defogging area 47 is formed by the heating wire 50 so as to surround a light emission area 48 of a lamp 26 mounted on the vehicle.

The lamp 26 is mounted on the vehicle-inner side with respect to the glass plate 12, and is a device that emits light through the glass plate 12 toward the outside of the vehicle (in the present embodiment, toward the rear of the vehicle). The lamp 26 is, for example, a high mount stop lamp. The lamp 26 emits light so that the driver of a vehicle behind can notice that the vehicle ahead is braking.

The light emission area 48 is an area on the glass plate 12 and represents an area where light is emitted by the lamp 26. The light emission area 48 is an example of a wiring-prohibited area. Specifically, the heating wires and the wiring of the antennas are prohibited in the light emission area 48.

Since the heating wire 50 is arranged so as to surround the light emission area 48, the light emitted by the lamp 26 can be prevented from being blocked by the heating wire 50. In addition, when a voltage is applied between the pair of bus bars 44a, 44b, the heating wire 50 is energized to generate heat, so that heat is transmitted from the outside of the light emission area 48 to the light emission area 48 to defog the light emission area 48. The heating wire 50 extends in the direction of the upper edge 12a so as to form the left upper area 21 and the right upper area 22, which can easily secure the areas for arranging the left rear antenna 31 and the right rear antenna 32. Therefore, according to the window glass 106 for a vehicle of the present embodiment, both of the defogging of the light emission area 48 and the securing of areas for arranging the left rear antenna 31 and the right rear antenna 32 can be achieved.

The heating wire 50 is a single line formed continuously by line portions 50a to 50o. The heating wire 50 has a left end portion connected to the upper end portion of the left bus bar 44a and a right end portion connected to the upper end portion of the right bus bar 44b.

The line portion 50a extends from the left bus bar 44a in the upper direction to the upper end portion. The line portion 50b extends from the upper end portion of the line portion 50a in the right direction to the right end portion. The line portion 50c extends from the right end portion of the line portion 50b in the right lower direction to the right lower end portion. The line portion 50d extends from the right lower end portion of the line portion 50c in the right direction to the right end portion. The line portion 50e extends from the right end portion of the line portion 50d in the upper direction to the upper end portion. The line portion 50f extends from the upper end portion of the line portion 50e in the left direction to the left end portion. The line portion 50g extends from the left end portion of the line portion 50f in the upper direction to the upper end portion. The line portion 50h extends from the upper end portion of the line portion 50g in the right direction to the right end portion. The line portion 50i extends from the right end portion of the line portion 50h in the lower direction to the lower end portion. The line portion 50j extends from the lower end portion of the line portion 50i in the left direction to the left end portion. The line portion 50k extends from the left end portion of the line portion 50j in the lower direction to the lower end portion. The line portion 50l extends from the lower end portion of the line portion 50k in the right direction to the right end portion. The line portion 50m extends from the right end portion of the line portion 50l in the right upper direction to the right upper end portion. The line portion 50n extends from the right upper end portion of the line portion 50m in the right direction to the right end portion. The line portion 50o extends from the right end portion of the line portion 50n in the lower direction to the right bus bar 44b.

The heating wire 50 includes the line portion 50g wired along the left edge of the light emission area 48, the line portions 50f, 50j wired along the lower edge of the light emission area 48, and a line portion 50i wired along the right edge of the light emission area 48. Further, the heating wire 50 includes the line portion 50h wired along the upper edge of the light emission area 48. In this way, since the heating wire 50 has a portion wired along the light emission area 48, the light emission area 48 can be quickly defogged. It is particularly preferable that the heating wire 50 has a portion that is wired in parallel to the light emission area 48 in order to quickly defog the light emission area 48.

The left rear antenna 31 is located in the left upper area 21 formed between the heating wire 51 and the line portion 50b of the heating wire 50 and between the line portion 50a of the heating wire 50 and the line portion 50c of the heating wire 50. The right rear antenna 32 is located in the right upper area 22 formed between the heating wire 51 and the line portion 50n of the heating wire 50 and between the line portion 50o of the heating wire 50 and the line portion 50m of the heating wire 50. Therefore, the areas for arranging the left rear antenna 31 and the right rear antenna 32 can be secured.

Figure 7:
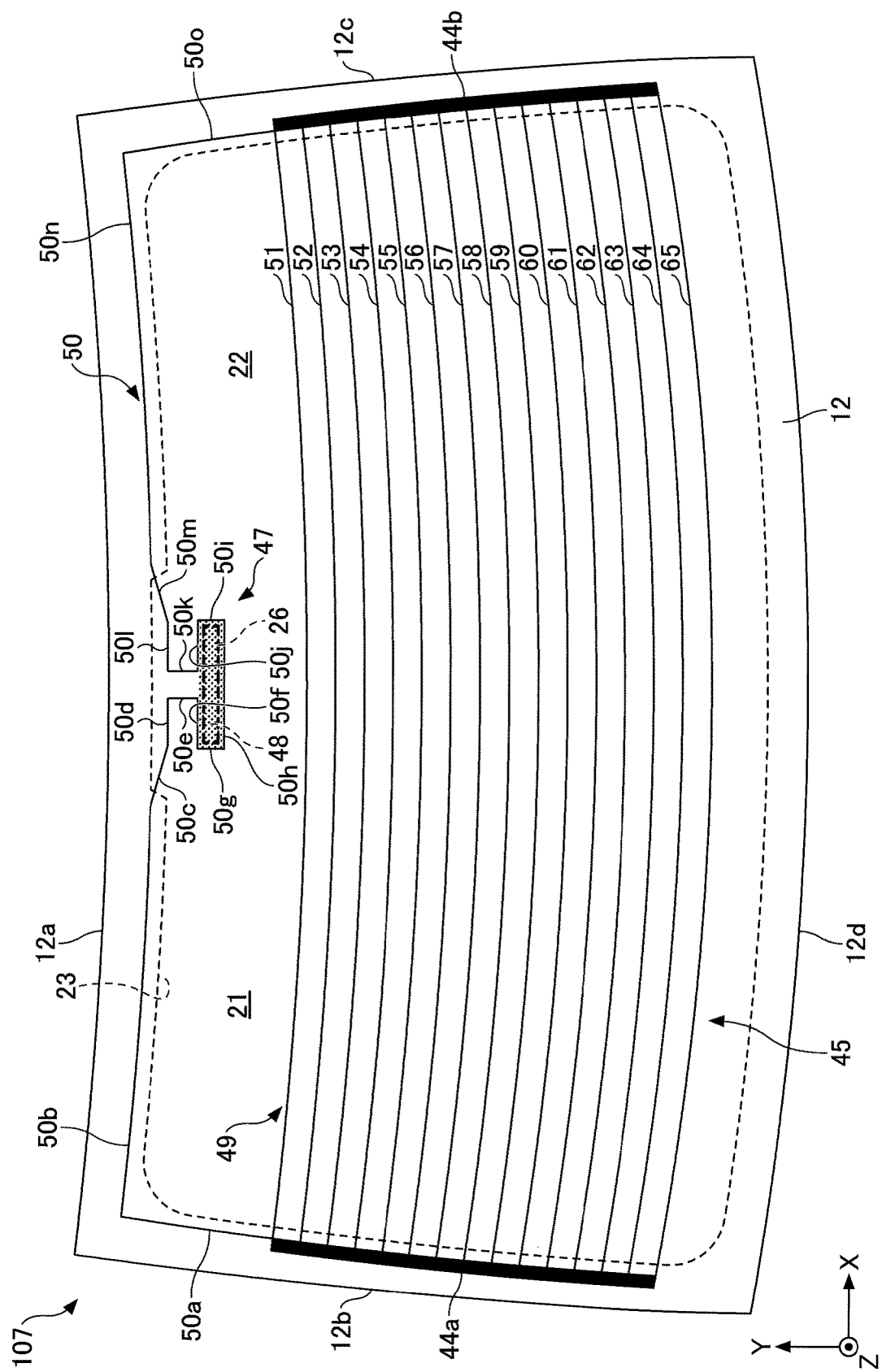
FIG. 7 is a top view illustrating a seventh configuration example of a window glass for a vehicle as seen from a vehicle-inner side.

FIG. 7 is a top view illustrating a seventh configuration example of a window glass for a vehicle as seen from a vehicle-inner side. A window glass 107 for a vehicle illustrated in FIG. 7 is different from the configuration illustrated in FIG. 6 with regard to the shape of the second defogging area. Explanation about constituent elements similar to those in the above figures is omitted or simplified by incorporating the above explanation by reference.

The heating wire 50 includes the line portion 50g wired along the left edge of the light emission area 48, the line portion 50h wired along the lower edge of the light emission area 48, and a line portion 50i wired along the right edge of the light emission area 48. Further, the heating wire 50 includes the line portions 50f, 50j wired along the upper edge of the light emission area 48. In this way, since the heating wire 50 has a portion wired along the light emission area 48, the light emission area 48 can be quickly defogged. It is particularly preferable that the heating wire 50 has a portion that is wired in parallel to the light emission area 48 in order to quickly defog the light emission area 48.

Figure 8:
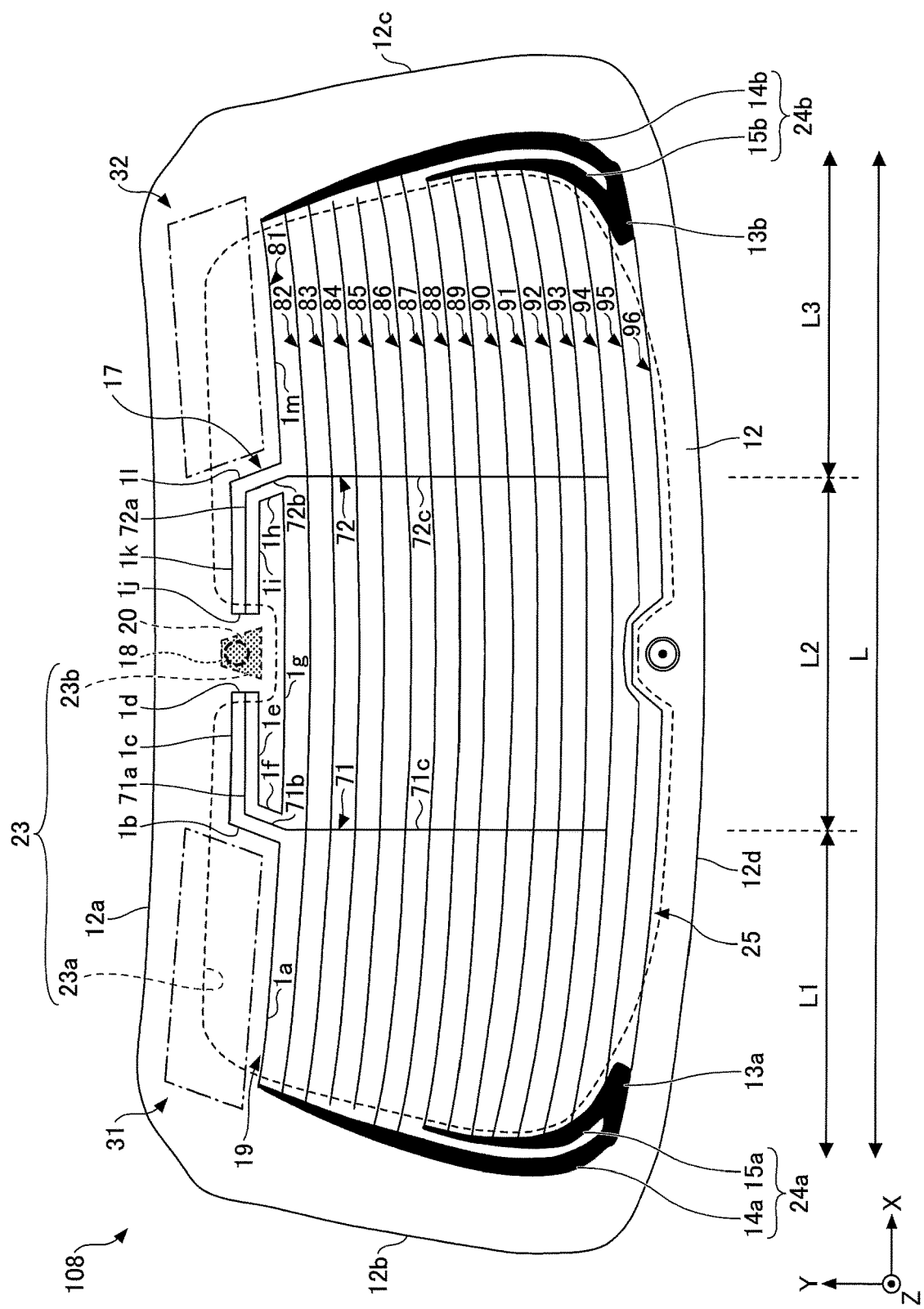
FIG. 8 is a top view illustrating an eighth configuration example of a window glass for a vehicle as seen from a vehicle-inner side.

FIG. 8 is a top view illustrating an eighth configuration example of a window glass for a vehicle as seen from a vehicle-inner side. A window glass 108 for a vehicle illustrated in FIG. 8, with respect to the configuration illustrated in FIG. 1, includes a first antenna element 71 and a second antenna element 72 over a first defogging area and a second defogging area. Explanation about constituent elements similar to those in the above figures is omitted or simplified by incorporating the above explanation by reference.

In the present embodiment, a pair of bus bars 24a, 24b are formed to include two pairs of partial bus bars. Heating wires 81 to 87 are connected to the first pair of partial bus bars 14a, 14b. Heating wires 88 to 96 are connected to the second pair of partial bus bars 15a, 15b. The lower end portions of the first left partial bus bar 14a and the second left partial bus bar 15a are connected to each other. The lower end portion is a left bus bar feeding portion 13a connected to one of the electrodes (for example, the positive electrode) of a power source (not illustrated). The lower end portions of the first right partial bus bar 14b and the second right partial bus bar 15b are connected to each other. The lower end portion is a right bus bar feeding portion 13b connected to the other of the electrodes (for example, the negative electrode) of the power source (not illustrated).

In the present embodiment, the first defogging area 25 is formed by the 15 heating wires 82 to 96, and the second defogging area 17 is formed by the heating wire 81. That is, the upper edge of the second defogging area 17 corresponds to line portions 1c, 1k. The lower edge of the second defogging area 17 corresponds to line portions 1a, 1g, and 1m. The second defogging area 17 includes an image-capturing area 18, for the camera 20 mounted on the vehicle, arranged in such a manner so as to be surrounded by the heating wire 81. Specifically, in the heating wire 81, a portion along the left-hand side of the image-capturing area 18 (wiring-prohibited area) corresponds to a line portion 1d, and a portion along the right-hand side corresponds to a line portion 1j. As illustrated in FIG. 8, the film edge of the concealment film 23 has a first loop 23a formed so as to intersect the heating wires 81 to 96 and a second loop 23b surrounding the image-capturing area 18. That is, the concealment film 23 does not overlap the image-capturing area 18. In the form of FIG. 8, the second loop 23b is formed along the outer periphery of the image-capturing area 18.

Further, the window glass 108 for a vehicle includes, for example, a left rear antenna 31 and a right rear antenna 32 (not illustrated) in the left and right areas, respectively, surrounded by alternate long and short dash lines in FIG. 8. A specific antenna pattern may be a pattern conductor designed to be able to transmit and receive radio waves in a desired frequency band, such as the patterns on the window glass 101 to 105 for a vehicle. Such pattern conductors can be appropriately arranged in left and right areas surrounded by the alternate long and short dash lines. It should be noted that the left and right areas surrounded by the alternate long and short dash lines are illustrated for the sake of convenience. For example, the antenna pattern may be arranged above the left and right areas. In particular, each of the left rear antenna 31 and the right rear antenna 32 is provided with a conductive pattern suitable for transmission and reception of radio waves in at least one of the VHF band and the UHF band.

In the window glass 108 for a vehicle, the first antenna element 71 includes line portions 71a, 71b, and 71c. The line portion 71a is connected to a line portion 1d of the heating wire 81 and extends from the line portion 1d in a left direction to a left end portion. The right end portion of the line portion 71a may be connected to around the center of the line segment of the line portion 1d. The line portion 71b extends from the left end portion of the line portion 71a in a left lower direction to a left lower end portion. The line portion 71c extends from the left lower end portion of the line portion 71b substantially in a height direction (lower direction).

In the window glass 108 for a vehicle of FIG. 8, the second antenna element 72 has line portions 72a, 72b, and 72c. The line portion 72a is connected to the line portion 1j of the heating wire 81 and extends from the line portion 1j in a right direction to a right end portion. The left end portion of the line portion 72a is connected to around the center of the line segment of the line portion 1j. The line portion 72b extends from the right end portion of the line portion 72a in a right lower direction to a right lower end portion. The line portion 72c extends from the right lower end portion of the line portion 72b substantially in a height direction (lower direction). In this way, the right end portion of the line portion 71a is connected to the center of the line segment of the line portion 1d, and the left end portion of the line portion 72a is connected to the center of the line segment of the line portion 1j. Therefore, the lines in the height direction (line portions 71c, 72c) can be arranged so that the entirety of the defogger 19 has the same potential.

Thus, it is preferable to connect the first antenna element 71 and the second antenna element 72 to the line portions 1d, 1j, respectively, of the heating wire 81. This is because, by connecting these antenna elements to the farthest parts of the second defogging area 17 (in this case, the line portions 1d, 1j) extending to the first defogging area 25, long conductor lengths can be secured for these elements, and the antenna gain can be improved. The first antenna element 71 and the second antenna element 72 are not limited to the present embodiment. Alternatively, the first antenna element 71 and the second antenna element 72 may be extended and connected to the line portions 1d, 1j of the window glass 101, 102 for a vehicle, or the first antenna element 71 and the second antenna element 72 may be extended and connected to the line portions 1o, 1q of the window glass 103 to 105 for a vehicle.

The first antenna element 71 and the second antenna element 72 are preferably symmetrical (line symmetrical), with respect to a center line (not illustrated) extending in the height direction so as to bisect the glass plate 12 into the right and left. This is because it is preferable to short-circuit positions having the same potentials so that no current flows in the lines in the height direction (line portions 71c, 72c). Also, in the configuration example of the window glass 108 for a vehicle illustrated in FIG. 8, the line portions 71c, 72c extend to intersect the heating wires 82 to 93 at an approximate perpendicular direction. The lower end portions of both the line portions 71c, 72c are connected to the heating wire 94. In this way, the reason why the lower end portions of the line portions 71c, 72c are not in contact with the heating wires 95, 96 is because the heating wires 95, 96 are shorter than the other heating wires, and may reduce the performance of the heating wires. In other words, in the arrangement pattern where the lower end portions of the line portions 71c, 72c are in contact with the heating wires 95, 96, although the desired antenna performance might be obtained, current paths would be generated in the heating wires 94 to 96, the first antenna element 71, and the second antenna element 72. As a result, the power density of the entire heating wires would change and a desired electric heat distribution may not be realized.

For this reason, the first antenna element 71 and the second antenna element 72 may be extended to a position where the lower end portion of the line portions 71c, 72c do not come into contact with at least the heating wire 96, that is, the first antenna element 71 and the second antenna element 72 may be extended to a position before the end portion of the first defogging area. In this way, when the first antenna element 71 and the second antenna element 72 intersecting multiple heating wires (in the case of the present embodiment, intersecting the heating wires 82 to 93) are arranged, the heating wire resonates at a frequency in the VHF band, and the gain of the antenna in the VHF band can be improved. Therefore, when the first antenna element 71 and the second antenna element 72 are arranged as in the present embodiment, a change in the current density of the heating wires can be alleviated, and the antenna performance can be improved particularly in the VHF band.

Next, in the window glass 108 for a vehicle of FIG. 8, a positional relationship of the line portions 71c, 72c of the first antenna element 71 and the second antenna element 72 will be explained. First, where a distance between the left bus bar 24a and the right bus bar 24b is denoted as L, a distance between the left bus bar 24a and the line portion 71c is denoted as L1, a distance between the line portion 71c and the line portion 72c is denoted as L2, and a distance between the line portion 72c and the right bus bar 24b is denoted as L3, the following expressions are preferably satisfied.

$$0.20 \times L \leq L1 \leq 0.40 \times L$$

$$0.20 \times L \leq L2 \leq 0.40 \times L$$

$$0.20 \times L \leq L3 \leq 0.40 \times L$$

In this way, when L1 to L3 satisfy the above ranges, each of the lengths L1 to L3 becomes ¼ of a wavelength for any given frequency in a frequency band of DAB (Digital Audio Broadcast) Band III (i.e., 170 MHz to 240 MHz). Therefore, a resonance occurs in the DAB band, and the antenna performance in the DAB band and FM broadcast frequency band (FM band) is improved. In such a case, at least one of the left rear antenna 31 and the right rear antenna 32 has a transmission and reception antenna capable of receiving at least FM band radio waves, and even if there is no transmission and reception antenna for the DAB band, the left rear antenna 31 and the right rear antenna 32 contribute to the improvement of the FM band antenna performance. Also, L1 to L3 preferably satisfy the following relationship.

$$0.30 \times L \leq L1 \leq 0.36 \times L$$

$$0.30 \times L \leq L2 \leq 0.36 \times L$$

$$0.30 \times L \leq L3 \leq 0.36 \times L$$

When the wavelength of the center frequency of the frequency band of DAB Band III is denoted as A and the wavelength shortening factor of glass is denoted as a (e.g., 0.64), L1 to L3 is preferably equal to or more than $(¼) \times \lambda \times \alpha \times 0.7$ and equal to or less than $(¼) \times \lambda \times \alpha \times 1.7$.

The window glass for a vehicle has been described above by way of the embodiment, but the present invention is not limited to the above embodiment. Various modifications and improvements such as combinations and substitutions with a part or the entirety of another embodiment are possible within the scope of the present invention.

For example, an "end portion" of a conductor (e.g., an antenna element, a heating wire, a bus bar, and the like) may be a starting or ending point of extension of the conductor, or may be a portion in proximity to the starting or ending point which is a conductor portion adjacent to the starting or ending point thereof. Further, a connecting portion between conductors may be connected with a curvature.

Bus bars, heating wires, antenna elements, and feeding portions are formed by, for example, printing and baking a paste containing conductive metal (for example, silver paste) on a vehicle-inner side face of a window glass. However, the method of forming bus bars, heating wires, antenna elements, and feeding portions is not limited to this method. For example, bus bars, heating wires, antenna elements, or feeding portions may be formed by providing a straight material or a foil-like material containing a conductive substance such as copper on a vehicle-inner side face or a vehicle-outer side face of a window glass. Alternatively, bus bars, heating wires, antenna elements, or feeding portions may be attached to the window glass with an adhesive or the like, or may be provided in the inside of the window glass.

The shape of the feeding portion may be determined according to the shape of the surface on which the conductive member or the connector is mounted. For example, rectangular or polygonal shapes such as a square, an approximate square, a rectangle, or an approximate rectangle are preferable in terms of mounting. Circular shapes such as a circle, an approximate circle, an ellipse, or an approximate ellipse may be adopted.

In addition, it may be possible to employ a structure in which a conductive layer that forms at least one of a bus bar, a heating wire, an antenna element, and a feeding portion is provided inside or on a surface of a synthetic resin film, and the synthetic resin film with the conductive layer is pasted to a vehicle-inner side face or a vehicle-outer side face of a window glass. Furthermore, it may be possible to employ a structure in which a flexible circuit board formed with antenna elements is provided on a vehicle-inner side face or a vehicle-outer side face of a window glass.

Further, a part or the entirety of a bus bar, a heating wire, an antenna element, and a feeding portion may be provided on a concealment film formed on a glass face at a peripheral portion of a window glass.

For example, the second defogging area may be formed by a single heating wire, or may be formed to protrude from a central portion of the glass plate 12 toward the lower edge 12d of the glass plate 12. The second heating wire may extend from the first defogging area, instead of extending from the pair of bus bars.

This international application claims the priority based on Japanese Patent Application No. 2017-139320 filed on Jul. 18, 2017, the entire content of which is incorporated to this international application by reference.

What is claimed is:

1. A window glass for a vehicle comprising:
a glass plate for a window of the vehicle;
a defogger provided on the glass plate; and
an antenna provided on the glass plate,
wherein the glass plate includes a wiring-prohibited area, which contains no wires of each of the defogger and the antenna;
wherein the defogger includes:
a pair of bus bars extending in a height direction of the glass plate;
a first defogging area formed by a plurality of first heating wires connected between the pair of bus bars and extending in a widthwise direction of the glass plate; and
a second defogging area formed by at least a second heating wire connected to the pair of bus bars or to the first defogging area and extending in a protruding manner to one side in the height direction to surround the wiring-prohibited area,
wherein the antenna is provided in at least one of areas that are an area on left of the second defogging area and an area on right of the second defogging area.

2. The window glass for the vehicle according to claim 1, wherein the second heating wire includes a portion wired along the wiring-prohibited area.

3. The window glass for the vehicle according to claim 1, wherein the second heating wire includes a portion thicker than the first heating wires.

4. The window glass for the vehicle according to claim 1, wherein the second heating wire and the first heating wires have same resistance values as each other between the pair of bus bars.

5. The window glass for the vehicle according to claim 1, wherein the second heating wire is wired so that the second defogging area is in a shape of a trapezoid.

6. The window glass for the vehicle according to claim 1, wherein heating wires included in the second heating wire have same resistance values as each other between the pair of bus bars.

7. The window glass for the vehicle according to claim 1, wherein one of heating wires included in the second heating wire and another of the heating wires included in the second heating wire have same line lengths as each other.

8. The window glass for the vehicle according to claim 1, wherein the second defogging area is formed to protrude from a central portion of the glass plate to the one side.

9. The window glass for the vehicle according to claim 1, wherein the antenna is located between the second heating wire and an edge of the glass plate at the one side.

10. The window glass for the vehicle according to claim 1, wherein the antenna is located between the second heating wire and the first heating wires.

11. The window glass for the vehicle according to claim 1, wherein the wiring-prohibited area is an image-capturing area for a camera mounted on the vehicle or a light emission area of a lamp mounted on the vehicle.

12. The window glass for the vehicle according to claim 1, wherein the second heating wire is formed continuously with a single wire.

13. The window glass for the vehicle according to claim 1, wherein the second heating wire is wired in a portion along a left-hand side of the wiring-prohibited area and a portion along a right-hand side of the wiring-prohibited area, and the antenna includes:
a first antenna element connected to the portion along the left-hand side of the wiring-prohibited area and extending through the first defogging area in the height direction to a position in proximity to an end portion of the first defogging area; and
a second antenna element connected to the portion along the right-hand side of the wiring-prohibited area and extending through the first defogging area in the height direction to a position in proximity to the end portion of the first defogging area.

14. The window glass for the vehicle according to claim 13, wherein where, in the first defogging area, a distance between the pair of bus bars is denoted as L, a distance between the first antenna element and a left bus bar of the pair of bus bars is denoted as L1, a distance between the first antenna element and the second antenna element is denoted as L2, and a distance between the second antenna element and a right bus bar of the pair of bus bars is denoted as L3, a relationship expressed by $$0.20 \times L \leq L1 \leq 0.40 \times L,$$

$$0.20 \times L \leq L2 \leq 0.40 \times L, \text{ and}$$

$$0.20 \times L \leq L3 \leq 0.40 \times L,$$

is satisfied.

15. The window glass for the vehicle according to claim 1, wherein the antenna can receive at least a radio wave in a frequency band of FM broadcasting.

* * * * *